United States Patent Office 3,155,717
Patented Nov. 3, 1964

3,155,717
PROCESS FOR THE PREPARATION OF TRIMESIC ACID
David Brown, New York, and Alfred Saffer, Bayshore, N.Y., assignors, by mesne assignments, to Mid-Century Corporation, Chicago, Ill., a corporation of Delaware
No Drawing. Filed June 27, 1956, Ser. No. 594,095
4 Claims. (Cl. 260—524)

This invention relates to a process for the catalytic oxidation of tri-isopropylbenzenes, particularly 1,3,5-tri-isopropylbenzene, by means of air or other molecular oxygen containing gaseous material to produce trimesic acid therefrom wherein the catalyst is a heavy metal compound, and particularly to such a process wherein the catalyst is a manganese compound, and more particularly, an organic carboxylate salt of manganese. The invention relates especially to such a process conducted at an elevated pressure in the presence of a lower organic carboxylic-acid of 1 to 4 carbon atoms in the molecule, wherein the ratio of lower carboxylic acid is in the range of 1 to 10 parts per part by weight of diisopropylbenzene, or in the presence of a lower organic carboxylic acid of 5 to 6 carbon atoms in the molecule, wherein there is present 1 to 8 mols of said acid per mol of diisopropylbenzene, or in the presence of such a mono-carboxylic acid of up to and including 8 carbon atoms in the molecule, and to such a process wherein the ratio of the mono-carboxylic acid is in the range of 1 to 10 parts per part by weight of 1,3,5-tri-isopropylbenzene.

Tricarboxybenzenes, such as trimellitic and trimesic acids are commercially desirable intermediates for the preparation of polyester type resins such as those that may be prepared by reaction with a polyhydric alcohol material such as ethylene glycol, glycerol, or the like. The art is confronted with the problem of providing trimesic acid of desired purity in an economic manner.

The discoveries associated with the invention for the solution of the above problem, and the objects achieved in accordance with the invention as set forth herein include the following: process for the catalytic oxidation of tri-isopropylbenzenes, particularly 1,3,5-tri-isopropylbenzene with molecular oxygen in the presence of a heavy metal compound catalyst in the presence of a lower mono-carboxylic as described above and preferably an acid which contains 2 to 4 carbon atoms in the molecule, using the ratio of 1 to 10 parts of the mono-carboxylic acid per part of the tri-isopropylbenzene, and preferably such a process wherein the catalyst is a manganese compound; and other objects which will be apparent as details or embodiments of the invention are set forth hereinafter. In order to facilitate a clear understanding of the invention, the following preferred specific embodiments are described in detail.

Example 1

Into a suitable pressure reactor having a corrosion resistant inner surface (e.g., glass, ceramic or corrosion resistant metal or alloy), equipped with agitating means such as a mechanical agitating device or gas flow agitating means, and with means for heating or cooling the contents thereof such as a coil or jacket, a condenser for refluxing non-aqueous condensate and some of the water to the reaction vessel, a gas inlet tube, and a valved vent for passing off inert gases and low boiling materials, there are charged:

125 parts by weight of 1,3,5-tri-isopropylbenzene (100%)
168 parts of acetic acid
2 parts of manganese acetate The reaction vessel is about half filled with the liquid mixture.

Air is passed into the reaction mixture at the rate of 4000 volumes (measured at atmospheric pressure and about 27° C.) per volume of hydrocarbon per hour, some gas being passed out through the vent system, while the reaction mixture is being maintained at 180° C., with vigorous agitation, for 6 hours, under the pressure of 400 p.s.i.g. (pounds per square inch gauge); the pressure being such that the reaction mixture includes a liquid phase containing mono-carboxylic acid.

The crude solid trimesic acid (1,3,5-tri-carboxylic benzene) in the mixture is separated by treatment with a mixture of equal parts of ethanol and benzene, and the separated solid has an acid number of 784. This compares with an acid number of 800 obtained with standard pure trimesic acid. In other words, the recovered material is substantially all trimesic acid and it is suitable for preparation of polyester type resins. If desired it may be further purified, e.g., by conversion to a lower alkanol ester and fractional distillation. The recovered ester may be converted to trimesic acid by hydrolysis in the presence of dilute aqueous acid.

A yield of about 48% by weight of the crude trimesic acid of about 80% or more purity is obtained, based on the tri-isopropylbenzene charged. The filtrate and other residues from the reaction mixture may be recycled to the reaction step and additional trimesic acid may be obtained therefrom.

Example 2

Example 1 is repeated except for the 1,3,5-tri-isopropylbenzene there is utilized an equal weight of 1,2,4-tri-isopropylbenzene. There is obtained a yield of 41% by weight of trimellitic acid having an acid number of 787.

Example 3

Example 1 is repeated substituting for the 1,3,5-tri-isopropylbenzene there utilized an equal weight of a mixture of tri-isopropylbenzenes boiling in the range 225–240° C. at 760 mm. Hg. There is obtained a 44% by weight yield of benzene tricarboxylic acids having an acid number of 776.

Example 4

Example 1 is repeated with:

125 parts by weight of 1,3,5-tri-isopropylbenzene
273 parts of caproic acid (23 parts of which is placed in the separatory device to be displaced into the reaction vessel by the water as condensed in the reflux condenser)
3.75 parts of manganese cumate Substantially 100% oxygen is fed into the reaction mixture at the rate of 4000 volumes( measured at atmospheric pressure and about 27° C.) per volume of hydrocarbon per hour, while the reaction mixture was maintained at 180° C., with vigorous mechanical agitation, for 9 hours.

A yield of 46% by weight of crude trimesic acid based on the 1,3,5-tri-isopropylbenzene starting material is obtained.

Example 5

Example 1 is repeated with 50 parts by weight of 1,3,5-tri-isopropylbenzene
100 parts of benzoic acid
1.5 parts of manganese cumate The reaction vessel is about half filled with the liquid mixture.

Substantially 100% oxygen is fed into the reaction mixture at the rate of 1000 volumes (measured at atmospheric pressure and about 27° C.) by volume of hydrocarbon per hour, while the reaction mixture is maintained at 180° C., with vigorous agitation, for 10 hours.

There is obtained a yield of 47% by weight of trimesic acid based on the 1,3,5-tri-isopropylbenzene starting material.

*Example 6*

Example 1 is repeated substituting for the manganese cumate there used an equivalent amount (based on manganese) of manganese oxide. Substantially similar results are obtained.

*Example 7*

Example 5 is repeated substituting for the manganese cumate there utilized an equivalent amount (based on manganese) of manganese hydroxide. Substantially similar results are obtained.

*Example 8*

Example 1 in a series of runs is repeated substituting for the acetic acid there utilized equal weights respectively of propionic, butyric, valeric, caproic, enanthic and caprylic acids and the pressure is varied to maintain the temperature of the system at a temperature of approximately 180° C. and to maintain a liquid phase of the carboxylic acid. There are obtained yields of trimesic acid in the range of 28–40% based on the 1,3,5-tri-isopropylbenzene starting material. Similar results are obtained utilizing 1,2,4-tri-isopropylbenzene and mixed tri-isopropylbenzenes as a starting material.

*Example 9*

In a series of two runs the procedure of Example 1 is repeated substituting for the manganese cumate there used equivalent amounts (based on manganese) of manganese borate and manganese nitrate respectively. Substantially similar results are obtained.

It will be realized that in the foregoing examples there may be substituted for the particular acids utilized therein as solvents monocarboxylic acids of 1 to 8 carbon atoms in the molecule. Preferably, these acids do not contain hydrogen atoms attached to a tertiary carbon atom.

While it is preferred to utilize the manganese compound in the form of a carboxylate, optionally as a salt of a particular carboxylic acid being utilized as a solvent, it will be realized that various other manganese salts are useful herein. These salts are illustrated, for example, by the oxide, hydroxide, nitrate, borate, and the like.

The metal carboxylate catalysts may be prepared by reacting the metal oxide or other compound with the appropriate acid in known manner. For higher acids they may be prepared by dissolving the appropriate organic acid in caustic, and then adding thereto an aqueous solution of the appropriate metal acetate. The desired metal carboxylate salt forms a precipitate, in the case of the carboxylic acids higher than acetic. The precipitate is separated by filtration, thoroughly washed with water, air dried, and then dried over calcium chloride under low pressure. For instance, manganese cumate may be prepared by dissolving 20 grams of cumic acid in 100 cc. of 5% by weight aqueous sodium hydroxide. A solution of 15 grams of manganese acetate dissolved in 75 cc. of water is gradually added thereto, with agitation. The manganese cumate precipitate which form is separated by filtration, thoroughly washed with water, air dried and then dried over calcium chloride under low pressure. An about 90% yield of the catalyst is obtained.

The process may be conducted in a batch, intermittent or a continuous manner.

Desirable results are achieved with various modifications of the foregoing, such as the following. The pressure should be sufficient to maintain a liquid phase containing lower acid. Generally, the pressure is in the range of 100 to 1500 p.s.i.g.

The lower aliphatic carboxylic acid may contain 1 to 6 carbon atoms in the molecule, preferably 2 to 4, and it should be relatively stable in the reaction system. Preferably it is saturated and free of hydrogen atoms attached to tertiary carbon atoms. Mixtures of acids may be used.

The reaction temperature may be in the range of 150 to 275° C., desirably 160 to 250° C., and preferably 175 to 225° C. The reaction temperature and pressure are interrelated, and a particular combination thereof is selected so as to maintain the desired amount of liquid lower acid in the reaction system. The reaction temperature may be regulated by adjusting the pressure so as to allow heat of reaction to be removed by volatilization of lower acid. Acid vapor may be removed from the system, passed through the reflux condenser to condense this vapor, an amount thereof returned to the reactor to maintain the desired acid concentration. The water formed during the reaction may be discarded from the system.

The reaction time may be in the range of 0.5 to 50 or more hours, the actual reaction time being sufficient to obtain a desirable yield of trimesic acid from the 1,3,5-tri-isopropylbenzene. Generally, higher reaction temperatures and corresponding pressures are reflected in shorter reaction times to give comparable yields of the desired products.

The manganese carboxylate catalyst may be the manganese salt of any carboxylic acid, which salt is finely dispersed in the reaction system, desirably a mono-carboxylic acid of 2 to 10 carbon atoms, and preferably the salt of an acid formed in the reaction system. Other manganese salts such as any of the halides may be used, also the manganese toluene sulfonates. Unique results may be obtained with such catalysts. However, if all the advantages thereof are not required, other heavy metal compounds may be used instead. Mixtures thereof may be used.

The tri-isopropylbenzene fed into the reactor may be in the form of any technically pure mixture free from contaminants of materials which may interfere with the oxidation. Generally the mixture may contain some di-isopropylbenzene and also some lower and higher alkylated benzenes. It may also contain some saturated aliphatic hydrocarbon material which is relatively resistant to oxidation in the system. For best results, substantially pure tri-isopropylbenzene should be used, e.g. 99 to 100%.

The amount of catalyst used may be in the range of 0.1 to 5.0% by weight based upon the weight of tri-isopropylbenzene fed into the reaction mixture, desirably 1 to 3; i.e., containing 0.2 to 2% of the metal.

The oxygen used may be in the form of substantially 100% oxygen gas or in the form of gaseous mixtures containing lower concentrations of oxygen, e.g., down to about 20%, such as in air. Where the gaseous mixture contains a relatively lower concentration of oxygen, a correspondingly higher pressure or flow rate of the gas should be used, in order that a sufficient amount (or partial pressure) of oxygen is actually fed into the reaction mixture.

The ratio of oxygen fed into the reaction mixture relative to the tri-isopropylbenzene is in the range of 9 to 100 or more mols of oxygen per mol of tri-isopropylbenzene, desirably in the range of 10 to 50 and preferably in the range of 10 to 15.

The reaction temperature, reactant concentration, catalyst and its concentration, reaction time and yield of product are interrelated. Generally, higher temperatures are reflected in shorter reaction times, as are more active catalysts. Too high temperatures or too severe conditions tend to give somewhat poorer product. The particular combination of reaction mixture composition and reaction conditions used should be selected with a view to obtaining the best output of desired quality product.

Other materials may be present during the oxidation reaction, providing they do not interfere with the desired reaction.

It is indeed surprising that trimesic acid may be prepared from 1,3,5-tri-isopropylbenzene in such a convenient manner in accordance with the invention, especially when one considers the diffificulty of obtaining this acid by heretofore proposed methods, even though there is a high commercial demand for the acid.

In view of the foregoing discussions, variations and modifications of the invention will be apparent to one skilled in the art, and it is intended to include within the invention all such variations and modifications except as do not come within the scope of the appended claims.

This application is a continuation-in-part of our presently co-pending application Serial No. 427,861, filed May 4, 1954, now abandoned.

What is claimed is:

1. A process for the preparation of trimesic acid which comprises reacting 1,3,5-triisopropylbenzene with molecular oxygen in the presence of a manganese carboxylate as catalyst and a monocarboxylic acid of 1 to 8 carbon atoms in the molecule at a temperature in the range of 150 to 275° C. and at a pressure such that a liquid phase of said lower acid is maintained.

2. A process for producing trimesic acid in a liquid phase oxidation which comprises reacting 1,3,5-tri-isopropylbenzene with molecular oxygen in the presence of a catalytic amount of a manganese compound and a lower saturated aliphatic mono-carboxylic acid having 2 to 4 carbon atoms as a solvent, at a temperature of from 150 to 275° C. and pressure such that a liquid phase of said acid is maintained.

3. A process for producing trimesic acid in a liquid phase oxidation which comprises reacting 1,3,5-tri-isopropylbenzene with molecular oxygen in the presence of a catalytic amount of a manganese carboxylate and acetic acid as a solvent, at a temperature of from 150 to 275° C. and pressure such that a liquid phase of said acid is maintained.

4. A process for producing trimesic acid in a liquid phase oxidation which comprises reacting 1,3,5-tri-isopropylbenzene with a catalytic amount of a manganese carboxylate and from 1 to 10 parts by weight of acetic acid per part of tri-isopropylbenzene at a temperature in the range of 180 to 210° C., at a pressure in the range of about 300 to 400 p.s.i.g.

References Cited in the file of this patent

UNITED STATES PATENTS

| | | |
|---|---|---|
| 2,245,528 | Loder | June 10, 1941 |
| 2,723,994 | Haefele et al. | Nov. 15, 1955 |
| 2,729,674 | McKinnis | Jan. 3, 1956 |
| 2,746,990 | Fortuin et al. | May 22, 1956 |
| 2,833,817 | Saffer | May 6, 1958 |
| 2,833,818 | Landau and Saffer | May 6, 1958 |
| 2,833,819 | Egbert and Brown | May 6, 1958 |
| 2,833,820 | Egbert and Brown | May 6, 1958 |

FOREIGN PATENTS

| | | |
|---|---|---|
| 681,455 | Great Britain | Oct. 22, 1952 |

OTHER REFERENCES

Newton: J.A.C.S., vol. 65, pp. 320–3 (1949).
Sidorova et al.: Chem. Ab., vol. 43, col. 6582–3 (1949).